United States Patent Office 3,307,907
Patented Mar. 7, 1967

3,307,907
REMOVAL OF IRON FROM CONCENTRATED BARIUM HYDROXIDE SOLUTIONS
Bennie Leroy Benning, Modesto, Calif., assignor to FMC Corporation, New York, N.Y., a corporation of Delaware
No Drawing. Filed Jan. 17, 1964, Ser. No. 338,319
4 Claims. (Cl. 23—186)

This invention relates to a method of removing iron from concentrated liquid barium hydroxide solutions, and more particularly, to the method of producing barium hydroxide solutions containing less than 10 parts per million (p.p.m.) of iron.

In my Patent No. 3,082,066, issued on March 19, 1963, and entitled, "Production of Barium Hydroxide Monohydrate," there is disclosed a method for producing barium hydroxide monohydrate having a desirably low reactivity. In this process, an aqueous solution of barium hydroxide containing from about 50% to about 66% barium hydroxide (55% to 73% barium hydroxide monohydrate) is placed in a thin film on a heated surface at from about 225° to about 275° F. in order to rapidly remove water from the solution; barium hydroxide monohydrate remains on the heated surface in the form of dried flake particles. In normal commercial use of this process, a relatively pure barium hydroxide monohydrate product is produced having the following impurities: barium carbonate, less than 0.5%; barium sulfate, less than 0.03%; iron, about 120 p.p.m.

Barium hydroxide monohydrate with these minor amounts of impurities is most satisfactory for producing additives in oil lubricants used in internal combustion engines. However, when the barium hydroxide monohydrate is used in the plastics industry for plasticizer applications, it has been found that the iron impurity interferes wth the plasticizer function and in some cases, results in an undesirable coloration of the plastic. This iron contamination is due to the dissolution of trace amounts of iron during the manufacture of barium oxide and is virtually impossible to avoid during commercial production of barium oxide. Thus, a purification step is required to reduce the iron content of the precursor barium hydroxide solution to acceptable levels i.e. not above 10 p.p.m. of iron on a barium hydroxide monohydrate basis.

It is known that the iron content of barium hydroxide solutions can be reduced by a process described in U.S. Patent 2,651,563 issued on September 8, 1953, to Mahlon J. Rentschler. In this process, magnesium oxide or magnesium hydroxide is added to either barium oxide or a solution thereof (barium hydroxide), which has been obtained by converting barium carbonate to barium oxide in a furnace in the presence of carbon. The barium carbonate can be the natural ore "Witherite," or an artificial carbonate. One common method for producing the carbonate is by heating barite (barium sulfate) with carbon to obtain barium sulfide, and then treating the barium sulfide with soda ash to obtain barium carbonate.

While this process is effective with relatively dilute solutions of barium hydroxide, i.e. up to 30% by weight of barium hydroxide monohydrate, this treatment fails to remove the iron when the solution to be purified reaches concentrations of about 40% barium hydroxide monohydrate.

Since typical precursor barium hydroxide solutions used to manufacture the monohydrate product, e.g. 62 to 63% by weight barium hydroxide monohydrate, are above this concentration, the iron is not removed by this treatment. Thus, to reduce the iron content of the monohydrate product to acceptable levels, the precursor $Ba(OH)_2$ solution must first be diluted with water to the proper concentration, then processed with MgO to remove the iron, and then reconcentrated by evaporating water until about a 62% by weight solution of barium hydroxide monohydrate has been reached. This adds additional processing steps and costs in the production of this product.

It is an object of the present invention to treat concentrated barium hydroxide solutions in a simple and economical manner so as to decrease the iron content of the solution to levels of no more than about 10 p.p.m. based on the barium hydroxide monohydrate in the solution.

This and other objects will become apparent from the following description of this invention.

I have now found unexpectedly that barium hydroxide solutions within the critical range of from about 67 to about 73% (and preferably from 69 to 71%) by weight of barium hydroxide monohydrate can be freed of iron contamination to levels below 10 p.p.m. by (a) adding to the solution, sufficient amounts (on the order of 0.05% to about 1% by weight) of magnesium oxide to render the iron insoluble, (b) maintaining the solution and the added magnesium oxide in intimate contact at a temperature of from about 85° to 110° C. for at least one hour, (c) filtering residual insolubles from the solution, and (d) recovering the barium hydroxide solution having no more than 10 p.p.m. of iron.

In the present process, the concentration of the barium hydroxide solution is critical for removal of the iron. If the concentrated barium hydroxide solution is below about 67% by weight of barium hydroxide monohydrate, the iron is not removed; at concentrations above about 73%, the barium hydroxide commences to crystallize out of solution and renders the iron removal difficult. It is unexpected to find that iron can be removed from a concentrated $Ba(OH)_2$ solution (over 40% by weight of barium hydroxide monohydrate) and this only when it is at critical concentrations of about 67 to 73% barium hydroxide monohydrate which approaches the saturation point of the solution.

In carrying out the present invention, a commercially pure barium oxide is mixed with sufficient water to form a solution containing from 67 to 73% by weight barium hydroxide monohydrate. A preferred concentration range is from about 69% to about 71% barium hydroxide monohydrate, since this has been found to be a more easily workable range and one in which the largest amount of iron is removed from the solution per unit amount of magnesium oxide added. To this solution is added sufficient magnesium oxide to treat and render insoluble the iron impurity. The amount of magnesium oxide which need be added to the solution depends upon the amount of iron impurity which is in the barium hydroxide solution and also the concentration of the solution.

If the barium hydroxide solution is at a concentration of about 67% by weight barium hydroxide monohydrate, each 0.1% of magnesium oxide added will be sufficient to treat about 25 p.p.m. of iron. At higher concentrations, up to about 69% barium hydroxide monohydrate, each 0.1% of magesium oxide added will be sufficient to treat progressively higher amounts of iron up to about 125 p.p.m. At concentrations of about 69% and above, up to 73% by weight of barium hydroxide monohydrate, each 0.1% of magnesium oxide added will progressively treat from about 125 to about 150 p.p.m. of iron. A slight excess of magnesium oxide is desirable since it does not hinder the iron removal in any way, and is readily separated from the solution by filtration.

The mixture is vigorously mixed to disperse the magnesium oxide in the solution and mixing is continued to maintain the magnesium oxide in intimate contact with all portions of the barium hydroxide solution. During this treating step, the temperature of the solution is maintained at a temperature of from about 85° C. to about 110° C.; a preferred range is from about 90° to 105° C. Temperatures below 85° C. are undesirable because the barium hydroxide crystallizes out of solution and interferes with the proper removal of the iron impurity. At temperatures above 110° C. the solutions generally boil, and reflux would be necessary to maintain the concentration of the solution.

The solution is maintained at this temperature with vigorous agitation until all of the magnesium oxide has reacted with the iron impurity. This normally takes on the order of about an hour. Thereafter, the hot solution is filtered to remove insolubles. The insolubles which remain on the filter screen comprise barium carbonate, which is water insoluble, excess magnesium oxide beyond the amount necessary to react with the iron, and a magnesium oxide—iron complex which is insoluble in the barium hydroxide solution. The resulting filtrate contains no more than 10 p.p.m. of iron as a result of this treatment.

The resulting barium hydroxide solution which is generally at concentrations of from about 69% to about 71% barium hydroxide monohydrate can then be fed to the final treating unit for conversion of the solution to the final barium hydroxide monohydrate flake product. In the event that this solution has too high a viscosity to be processed by the equipment properly, it may be diluted with water to a more workable viscosity, e.g. about 63% by weight barium hydroxide monohydrate.

The following examples are given to illustrate the invention and are not deemed to be limiting thereof.

EXAMPLE 1

A concentrated aqueous barium hydroxide solution was made up containing 69.83% by weight of barium hydroxide monohydrate and 146 parts per million of a soluble iron impurity. To this solution was added 0.1% by weight of magnesium oxide. The solution was agitated vigorously at a temperature of 95° C. for 1 hour and then filtered. The filtrate of barium hydroxide solution was found to contain only 8 parts per million of iron.

EXAMPLE 2

A concentrated aqueous barium hydroxide solution was made up containing 71% by weight of barium hydroxide monohydrate and 139 parts per million of soluble iron. To the solution was added 0.4% by weight of magnesium oxide. The resulting solution was agitated vigorously at a temperature of 99° C. for 1 hour. Thereafter, the solution was filtered and the filtrate was found to contain zero part per million of iron.

EXAMPLE 3

Run A.—A concentrated aqueous barium hydroxide solution was made up containing 69% by weight barium hydroxide monohydrate and 136 parts per million of soluble iron. To the solution was added 0.1% by weight of magnesium oxide. The resulting solution was agitated vigorously at a temperature of 99° C. for about 1 hour. Thereafter, the solution was filtered and was found to contain 15 parts per million of iron.

Run B.—The above run was repeated using 0.4% by weight of magnesium oxide. After filtration, the resulting filtrate contained zero part per million of iron.

Run C.—By way of comparison, two aqueous solutions of barium hydroxide were made up; the first solution contained 45% by weight barium hydroxide monohydrate and about 145 parts per million of soluble iron and the second contained 63% by weight barium hydroxide monohydrate and 121 parts per million of a soluble iron impurity.

To the first solution was added 0.7% by weight of magnesium oxide and the solution was vigorously agitated at a temperature of 90° C. for 1 hour. Thereafter, the solution was filtered to remove insolubles and the filtrate analyzed for its iron content; it contained 120 parts per million of iron indicating little iron removal.

To the second solution was added 0.1% by weight of magnesium oxide and the solution was vigorously agitated at a temperature of 100° C. for 1 hour. Thereafter, the solution was filtered to remove insolubles and the filtrate analyzed for its iron content; it contained 113 parts per million of iron indicating little iron removal.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:

1. Method for producing concentrated aqueous solutions of barium hydroxide containing no more than 10 parts per million of iron impurities which comprises adding magnesium oxide to an aqueous barium hydroxide solution containing from 67 to 73% by weight of barium hydroxide monohydrate, said magnesium oxide being present in amounts sufficient to render insoluble said iron impurities, maintaining said solution and said added magnesium oxide at a temperature of from about 85° to 110° C. for at least about an hour, filtering said solution to remove insolubles from said solution, and recovering a filtrate of said solution containing no more than 10 parts per million of iron.

2. Method of claim 1 in which said solution has a concentration of from about 69% to about 71% by weight of barium hydroxide monohydrate.

3. Method of claim 1 in which said magnesium oxide is added in amounts of from about 0.05% to about 1% by weight of said solution.

4. Method of claim 1 in which said temperature is from about 90° to about 105° C.

References Cited by the Examiner

UNITED STATES PATENTS 2,651,563  9/1953  Rentschler et al. _____ 23—186

OSCAR R. VERTIZ, *Primary Examiner.*

J. J. BROWN, *Assistant Examiner.*